(12) United States Patent
Liu et al.

(10) Patent No.: US 7,995,701 B2
(45) Date of Patent: Aug. 9, 2011

(54) NUCLEAR CORE COMPONENT HOLD-DOWN ASSEMBLY

(75) Inventors: Jin Liu, Elgin, SC (US); Yu Chung Lee, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 668 days.

(21) Appl. No.: 12/124,195

(22) Filed: May 21, 2008

(65) Prior Publication Data
US 2009/0323887 A1    Dec. 31, 2009

(51) Int. Cl.
*G21C 3/33*    (2006.01)
(52) U.S. Cl. .......................... 376/364; 376/302; 376/441
(58) Field of Classification Search .................. 376/302, 376/364
See application file for complete search history.

(56) References Cited

U.S. PATENT DOCUMENTS

| | | | |
|---|---|---|---|
| 3,354,040 A | 11/1967 | Frame et al. | |
| 3,425,905 A * | 2/1969 | Greenhalgh et al. | 376/363 |
| 3,977,940 A | 8/1976 | Frisch et al. | |
| 4,078,967 A | 3/1978 | Anthony | |
| 4,728,487 A | 3/1988 | Cooney et al. | |
| 4,765,947 A | 8/1988 | Babin et al. | |
| 4,820,475 A * | 4/1989 | Mayers et al. | 376/327 |
| 4,966,747 A | 10/1990 | Tower et al. | |
| 4,983,351 A | 1/1991 | Tower et al. | |
| 5,057,270 A | 10/1991 | Chevereau | |
| 5,078,957 A | 1/1992 | Tower et al. | |
| 5,263,060 A | 11/1993 | Obermeyer | |
| 5,265,138 A | 11/1993 | DeMario et al. | |
| 5,357,547 A | 10/1994 | Obermeyer et al. | |
| 7,085,340 B2 * | 8/2006 | Goldenfield et al. | 376/438 |

FOREIGN PATENT DOCUMENTS

JP    2002-317553 A    * 10/2002

OTHER PUBLICATIONS

Academic Press Dicitionary of Science and Technology, copyright © 1992, 1996, electronicially retrieved from htpp:/www.credo.reference.com, "sleeve".*

* cited by examiner

*Primary Examiner* — Johannes P Mondt

(57) ABSTRACT

A plate mounted fuel assembly hold-down system that provides a defined channel for both the insertion and removal of reactor head mounted, fixed in-core detector instrumentation, provides a guided path for the fixed in-core detector during insertion, and shields the instrument shroud against coolant cross flow. The hold-down assembly includes a base plate that seats on the adapter plate of the fuel assembly and has openings that align with the control rod guide thimbles. A hollow sleeve extends through and below a central opening in the base plate to mate with the fuel assembly instrument thimble. The sleeve extends above the base plate and through and above an upper core plate of the reactor. A hold-down bar is slidably mounted on the sleeve and is restrained below the top of the sleeve. A spring is positioned around the sleeve and is captured between the hold-down bar and the base plate.

19 Claims, 7 Drawing Sheets

NUCLEAR CORE COMPONENT HOLD-DOWN ASSEMBLY

BACKGROUND OF THE INVENTION

1. Field of the Invention

The present invention relates generally to a nuclear core component hold-down assembly and more particularly to such a hold-down assembly that is compatible with a top mounted instrumentation system that can provide a defined channel at a central location in the fuel assembly for the insertion and removal of in-core instrumentation.

2. Description of the Prior Art

The primary side of nuclear reactor power generating systems which are cooled with water under pressure comprises a closed circuit which is isolated and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above described loops are connected to a single reactor vessel 10 by reactor coolant piping 20.

An exemplary reactor design is shown in more detail in FIG. 2. In addition to the core 14 comprised of a plurality of parallel, vertical, co-extending fuel assemblies 22, for purposes of this description, the other vessel internal structures can be divided into the lower internals 24 and the upper internals 26. In conventional designs, the lower internals function is to support and align core components and guide instrumentation as well as direct flow within the vessel. The upper internals restrain or provide a secondary restraint for the fuel assemblies 22 (only two of which are shown for simplicity in this figure), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180° in a lower plenum 34, passes upwardly through a lower support plate 37 and a lower core plate 36 upon which the fuel assemblies 22 are seated and through the assemblies. In some designs, the lower support plate 37 and the lower core plate 36 are replaced by a single structure, the lower core support plate, at the same elevation as 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40, primarily by a plurality of support columns 48. A support column is aligned above a selected fuel assembly 22 and perforations 42 in the upper core plate 40.

The rectilinearly moveable control rods 28 typically include a drive shaft 50 and a spider assembly 52 of neutron poison rods that are guided through the upper internals 26 and into aligned fuel assemblies 22 by control rod guide tubes 54. The guide tubes are fixedly joined to the upper support assembly 46 and connected by a split pin 56 force fit into the top of the upper core plate 40. The pin configuration provides for ease of guide tube assembly and a replacement if ever necessary and assures that the core loads, particularly under seismic or other high loading accident conditions are taken primarily by the support columns 48 and not the guide tubes 54. This support column arrangement assists in retarding guide tube deformation under accident conditions which could detrimentally affect control rod insertion capability.

FIG. 3 is an elevational view, represented in vertically shortened form, of a fuel assembly being generally designated by reference character 22. The fuel assembly 22 is the type used in a pressurized water reactor and has a structural skeleton which, at its lower end includes a bottom nozzle 58. The bottom nozzle 58 supports the fuel assembly 22 on a lower core support plate 36 in the core region of the nuclear reactor. In addition to the bottom nozzle 58, the structural skeleton of the fuel assembly 22 also includes a top nozzle 62 at its upper end and a number of guide tubes or thimbles 54, which extend longitudinally between the bottom and top nozzles 58 and 62 and at opposite ends are rigidly attached thereto.

The fuel assembly 22 further includes a plurality of transverse grids 64 axially spaced along and mounted to the guide thimbles 54 (also referred to as guide tubes) and an organized array of elongated fuel rods 66 transversely spaced and supported by the grids 64. Also, the assembly 22 has an instrumentation tube 68 located in the center thereof and extending between and mounted to the bottom and top nozzles 58 and 62. With such an arrangement of parts, fuel assembly 22 forms an integral unit capable of being conveniently handled without damaging the assembly of parts.

As mentioned above, the fuel rods 66 in the array thereof in the assembly 22 are held in spaced relationship with one another by the grids 64 spaced along with fuel assembly length. Each fuel rod 66 includes nuclear fuel pellets 70 and is closed at its opposite ends by upper and lower end plugs 72 and 74. The pellets 70 are maintained in a stack by a plenum spring 76 disposed between the upper end plug 72 and the top of the pellet stack. The fuel pellets 70, composed of fissile material, are responsible for creating the reactive power of the reactor.

It is important to manage the axial and radial power profile of the core because the power output of the reactor is limited by the hottest temperature experienced along a fuel rod 66. There is a need to keep the operating conditions below that which will result in a departure from nucleate boiling along the cladding of the fuel rod 66. Under that type of condition the heat transfer from the fuel rod 66 to the adjacent coolant deteriorates raising the temperature of the fuel rod which can result in cladding failure. A liquid moderator/coolant such as water or water containing boron, is pumped upwardly through a plurality of flow openings in the lower core support plate 36 to the fuel assembly 22. The bottom nozzle 58 of the fuel assembly passes the coolant upwardly along the fuel rods of the assembly in order to extract the heat generated therein for the production of useful work.

To control the fission process, a number of control rods 78 are reciprocally moveable in the guide thimbles 54 located at predetermined positions in the fuel assembly 22. Specifically, a rod cluster control mechanism (spider pack) 80 positioned above the top nozzle 62 supports the control rods 78. The control mechanism has an internally threaded cylindrical hub member 82 with a plurality of radially extending flukes or arms 52. Each arm 52 is interconnected to the control rods 78 such that the control rod mechanism 80 is operable to move the control rods vertically in the guide thimbles 54 to thereby control the fission process in the fuel assembly 22, under the motive power of control rod drive shafts 50 which are coupled to the control rod hubs 82, all in a well-known manner.

As previously mentioned, the fuel assemblies are subject to hydraulic forces that may exceed the weight of the fuel assemblies and therefore cause the fuel assemblies to "float" in the reactor if they are not properly secured. If a fuel assembly were to float upward just enough to cause it to be disengaged from the seating surface of the lower core plate on which it sits, it would vibrate laterally, and this condition could subject the fuel assembly to severe fretting. Because of this possibility, fuel assembly designs have included elements whose purpose is to prevent floating.

One method of preventing floating is to mount springs (86 shown in FIG. 3) on the tops of the fuel assemblies. The springs are compressed between the upper core plate and the remainder of the fuel assembly, thereby providing sufficient hold-down force to prevent the fuel assembly from being disengaged from seating surfaces on the lower core support plate. Another example of such a spring arrangement is described in U.S. Pat. No. 4,728,487. The foregoing patent describes a hold-down arrangement comprising a vertical column centrally supported on the upper surface of the top nozzle adapter plate. A spring is concentrically wound around the column and a hold-down bar (yoke) is slidably mounted on the column over the spring. The hold-down bar rests against the upper core plate when installed in the reactor and compresses the spring to hold down the fuel assembly and core component. In conventional reactor designs, such as the one described in the patent, thermal couples are positioned at the lower end of the support columns 48 and the thermal couple signal cabling are fed through the support columns and exit the reactor through penetrations in the reactor head 12, which are not shown in FIG. 2. The in-core flux detectors and other in-core instrumentation that are located in the fuel assembly instrumentation thimbles are fed through penetrations in the lower head of the reactor, the lower support plate 37 and lower core plate 36 into the instrument thimbles (also referred to as instrumentation tubes) 68 through the bottom of the fuel assemblies 22. In the conventional designs no instruments are fed into the instrument thimbles through the top of the fuel assemblies. Access to the top of the instrumentation thimbles are blocked by the hold-down arrangement described in U.S. Pat. No. 4,728,487.

The Westinghouse AP1000 reactor is a third generation-plus pressurized water reactor design. The moveable bottom-mounted in-core instrumentation has been replaced by a fixed top-mounted instrumentation system that accesses the core through penetrations in the reactor head 12. Thus, no vessel penetrations exist beneath the bottom of the core. The in-core instrumentation is important for providing an in-core flux map and signals necessary for monitoring core exit temperatures of the reactor core, which are used to calibrate neutron detectors and to optimize core performance.

Accordingly, a new design is required to access the instrument thimbles 68 from the top of the fuel assembly 22 and provide a centering alignment and shielding the instrumentation components from cross flow. Such a design is desired that will provide effective shielding with minimal changes to the conventional hold-down devices.

SUMMARY OF THE INVENTION

The hold-down assembly of this invention accommodates the foregoing need by providing a base plate that fits within the fuel assembly top nozzle and is secured to the adapter plate via a cylindrical tube spring guide. The cylindrical tube spring guide extends through and above the base plate and has a spring or spring coils that circumscribe the spring guide's outer surface. A hold-down bar is slidably mounted in an upper portion of the spring guide above the springs and the springs are compressed between the hold-down bar and the base plate with the hold-down bar bearing upon the reactor internals upper core plate lower surface when the fuel assembly is installed in the reactor core. The springs hold the base plate down against the fuel assembly top nozzle adapter plate and prevent the core component assembly, e.g., wet annular burnable absorber assembly, from lifting off the top nozzle adapter plate. The hold-down bar is mounted on the spring guide with at least two radially inwardly extending pins welded to the yoke. The pins travel within slots in the spring guide.

Openings in the hold-down base plate are aligned with the guide thimbles in the fuel assemblies and accommodate and support core component rod assemblies such as wet annular burnable absorber assemblies, primary source and secondary source assemblies, water displacer rod assemblies, thimble plug devices, and peripheral power suppression assemblies.

The spring guide is a hollow cylindrical tube with two different interior diameters. The upper section has a larger inner diameter to receive the instrumentation shroud with sufficient cavity length to accommodate the differential thermal and irradiation growth between the reactor vessel and the fuel assembly. The lower portion of the interior of the spring guide has a smaller inner diameter to guide the top mounted instrumentation shroud passing through the top nozzle adapter plate into the instrumentation tube of the fuel assembly. The top of the spring guide has a protrusion above the hold-down yoke bar that extends through and above the upper core plate when the fuel assembly is installed in the reactor core to fully shield the instrumentation shroud from exposure to the upper core outlet flow jet disturbances as well as the induced cross flow that would otherwise impinge on the suspended instrumentation shroud.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
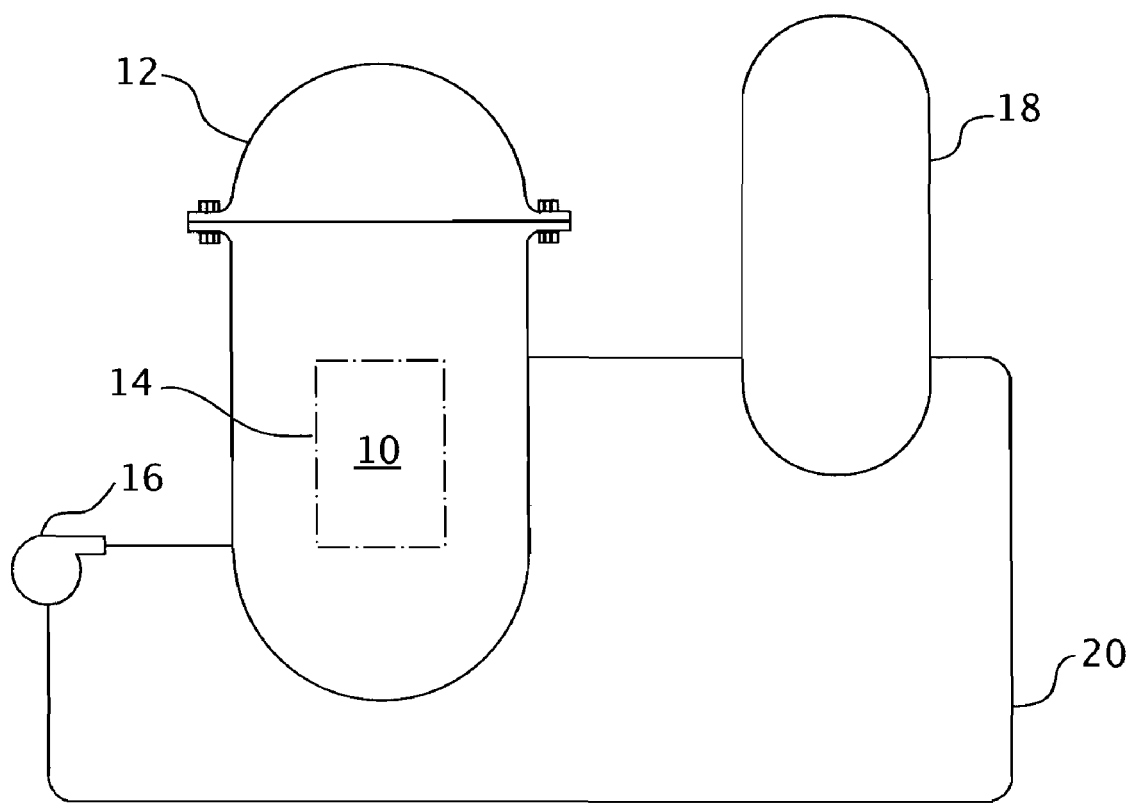
FIG. 1 is a simplified schematic of a nuclear reactor system to which this invention can be applied.
Figure 2:
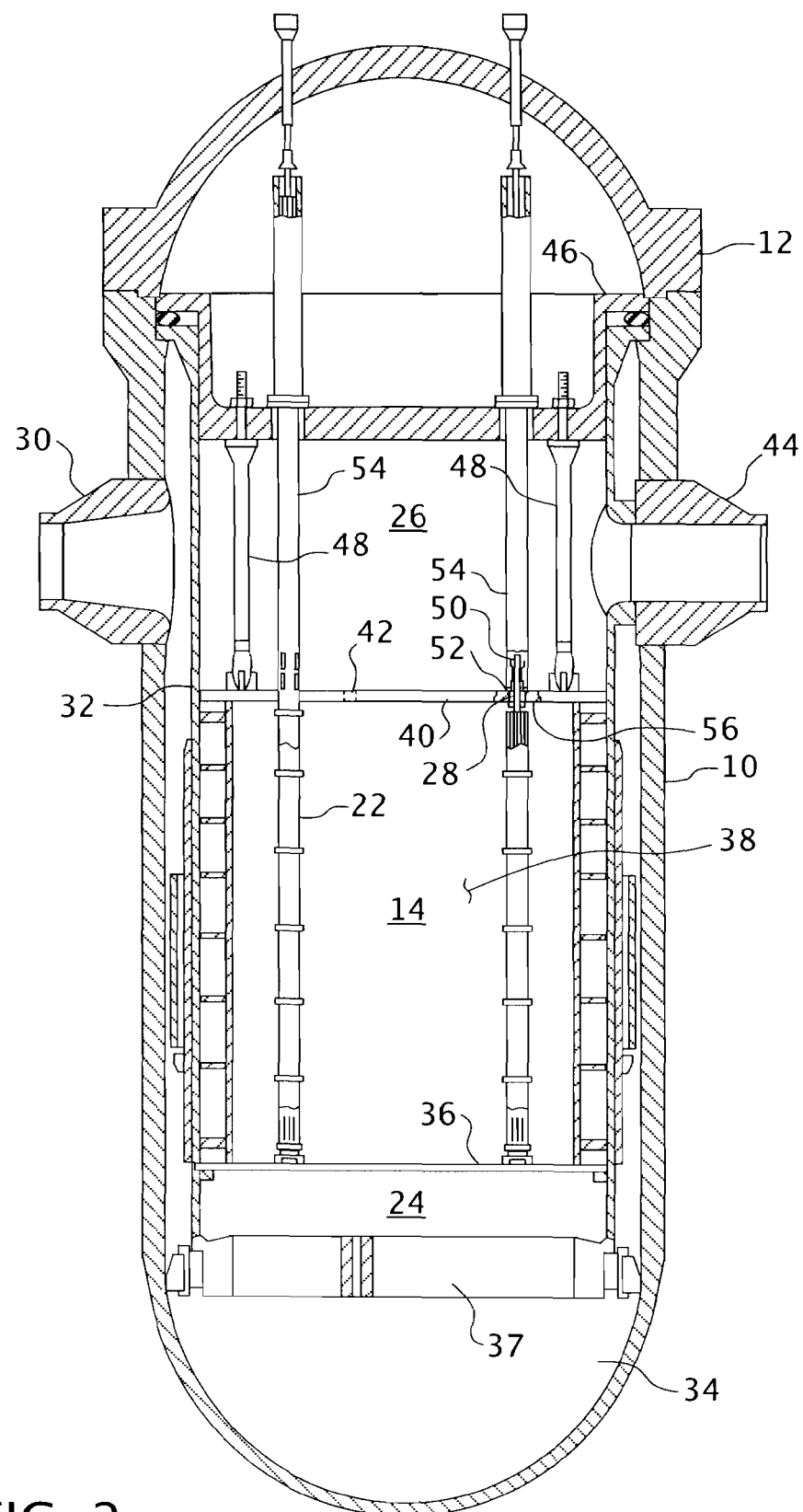
FIG. 2 is an elevational view, partially in section, of a nuclear reactor vessel and internal components to which this invention can be applied.
Figure 3:
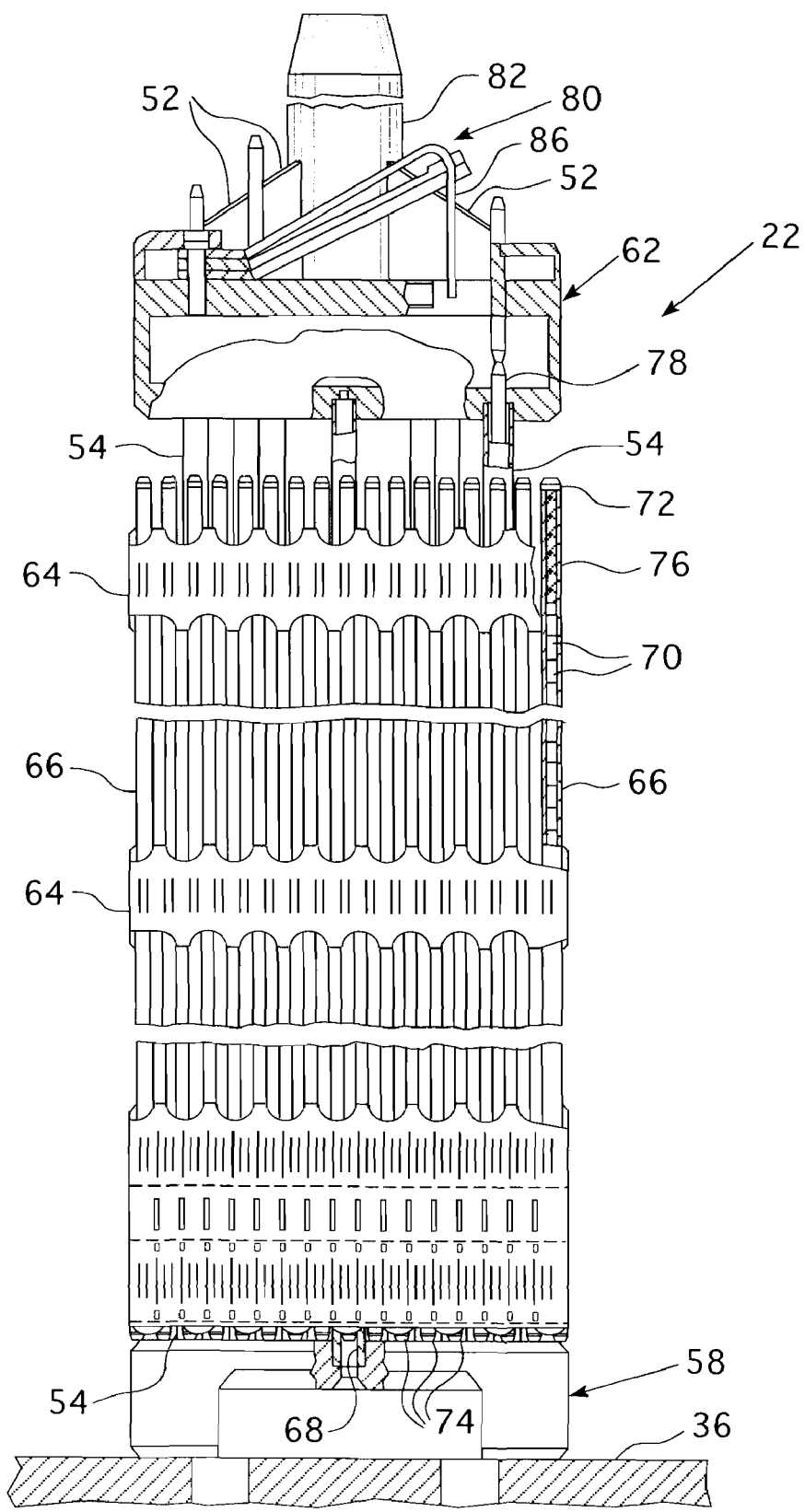
FIG. 3 is an elevational view, partially in section, of a fuel assembly with a rod cluster control assembly, illustrated in vertically shortened form, with parts broken away for clarity.
Figure 4:
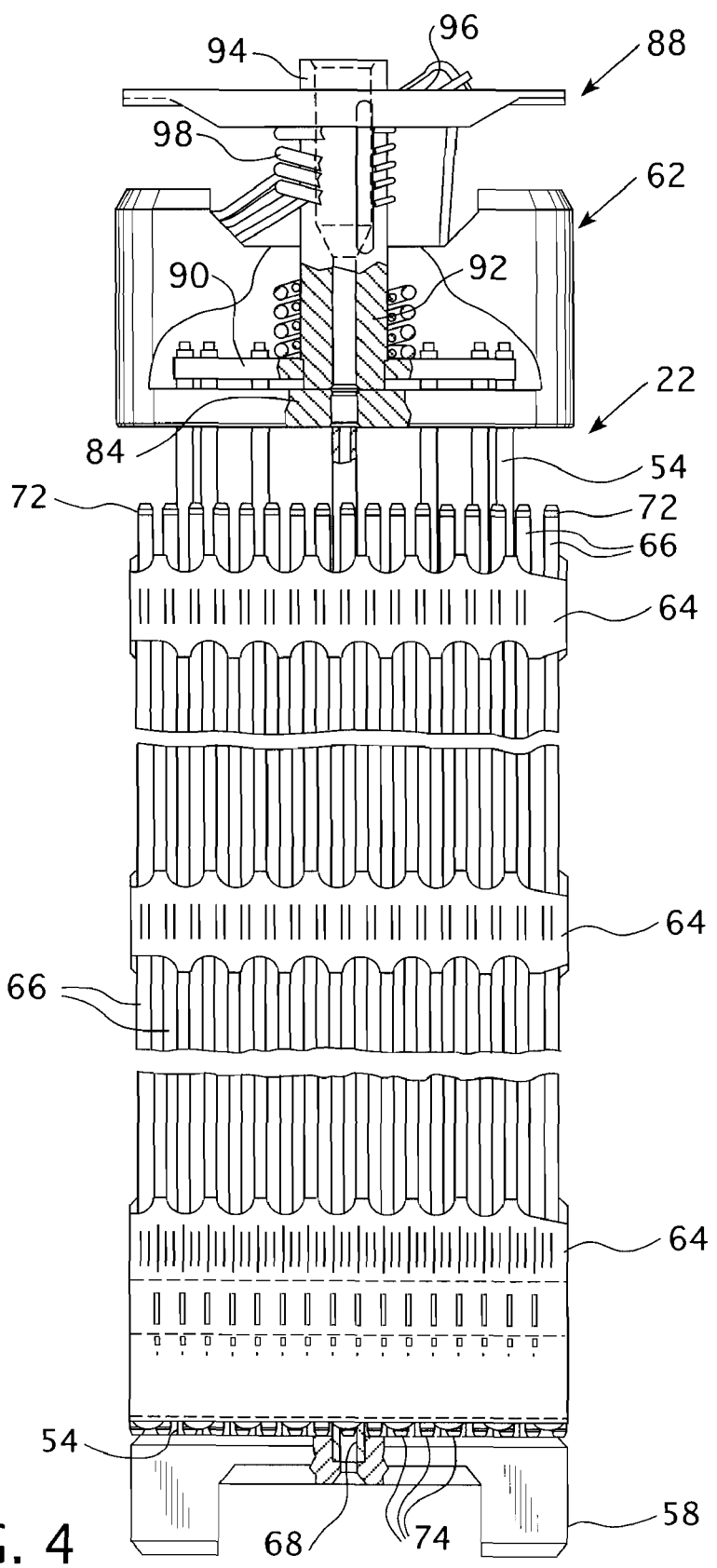
FIG. 4 is an elevational view, partially in section, of the fuel assembly shown in FIG. 3 modified to incorporate the hold-down device of this invention.

FIG. 4 is an elevational view, partially in section of the fuel assembly shown in FIG. 3 with the hold-down device 88 of this invention installed in the fuel assembly top nozzle 62. The hold-down device can better be appreciated by reference to FIG. 5 which shows a perspective view of the hold-down device 88 with an in-core instrumentation thimble assembly 110 extending therethrough. The hold-down assembly 88 generally comprises a base plate 90, a cylindrical tube spring guide 94, an inner and outer coil springs, or alternately a single spring 98, and a hold-down bar or yoke 96. The springs 98 are compressed between the yoke 96 and the base plate 90 with the yoke bearing upon the under side of the reactor internals upper core plate which is shown as reference character 40 in FIG. 2. The springs 98 hold the base plate 90 down against the fuel assembly top nozzle adapter plate 84 as can be observed from FIG. 4. The yoke 96 is slidably mounted on the spring guide 94 with two radially, inwardly extending, diametrically spaced pins 100 welded to the yoke 96. The pins 100 travel within slots 102 in the spring guide 94. The spring guide 94 extends above the upper limit of travel of the hold-down bar 96, as defined by the slots 102, a selected distance of approximately 5 in. (12.7 cm.), so that a portion of that extension protrudes above the upper core plate 40. The portion 104 of the spring guide 94 that extends through and above an aperture in the upper core plate 40 shields the instrumentation shroud 108 from the upper core outlet flow jet disturbances as well as the induced cross flow impinging on the suspended instrumentation shroud 108.

Figure 5:
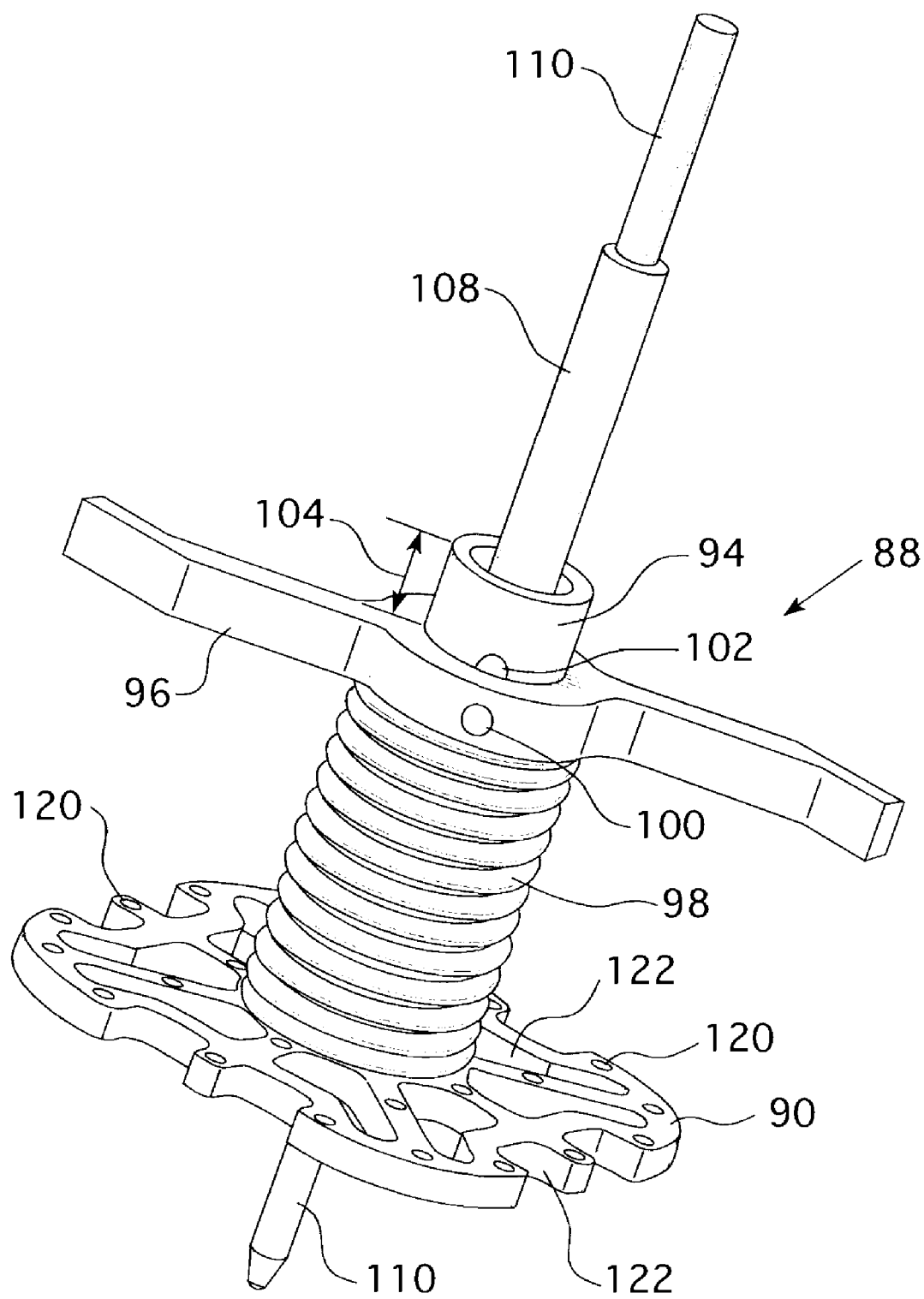
FIG. 5 is a perspective view of the hold-down device of this invention with an in-core instrumentation thimble assembly extending therethrough (with the upper core plate and top nozzle omitted for clarity.

Thus, the plate mounted core component hold-down assembly 88 of this invention is specifically designed to be compatible with a top mount instrumentation system and provides a defined channel at a central location in the fuel assembly. The invention is compatible with the insertion and removal of the fixed in-core detector instrumentation 110 to provide a guided path for the fixed in-core detector during insertion and to provide a shield in the area 104 against cross flow during reactor operation. The core component assemblies with the top mounted instrumentation interface that the hold-down system of this invention has to accommodate include the wet annular burnable absorber assembly, primary source and secondary source assemblies, water adapter rod assembly, thimble plugging device and peripheral power suppression assembly. The holes 120 shown in FIG. 5 are for attaching the rodlets of the core component assemblies. The openings 122 are coolant flow through passages.

Figure 6:
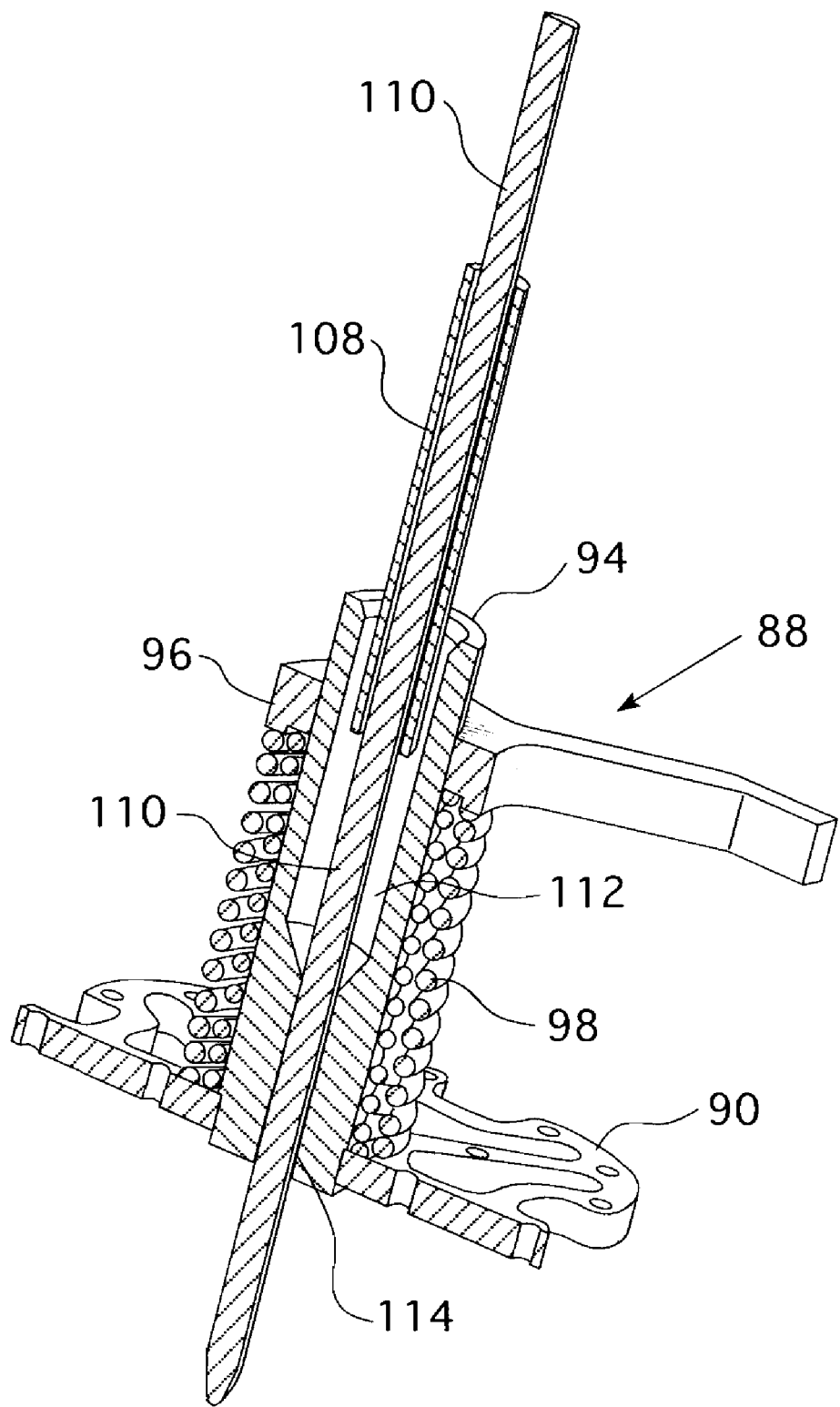
FIG. 6 is a cross-sectional view of the hold-down device of this invention illustrated in FIG. 5.

FIG. 6 shows a cross-section of the hold-down device 88 of this invention illustrated in FIG. 5. From FIG. 6 it can be appreciated that the spring guide 94 is a hollow cylindrical tube with two different inner diameters 112 and 114. The upper section 112 has a larger inner diameter to receive the instrumentation shroud 108 with sufficient cavity length in the region 112 to accommodate the differential thermal and irradiation growth between the reactor vessel and the fuel assembly so that the in-core instrumentation assembly 110 is not exposed to the coolant forces. The lower portion 114 of the spring guide 94 has a smaller inner diameter to guide the top mounted instrumentation 110 passing through the top nozzle adapter plate 84 into the instrumentation tube 68 of the fuel assembly 22.

Figure 7:
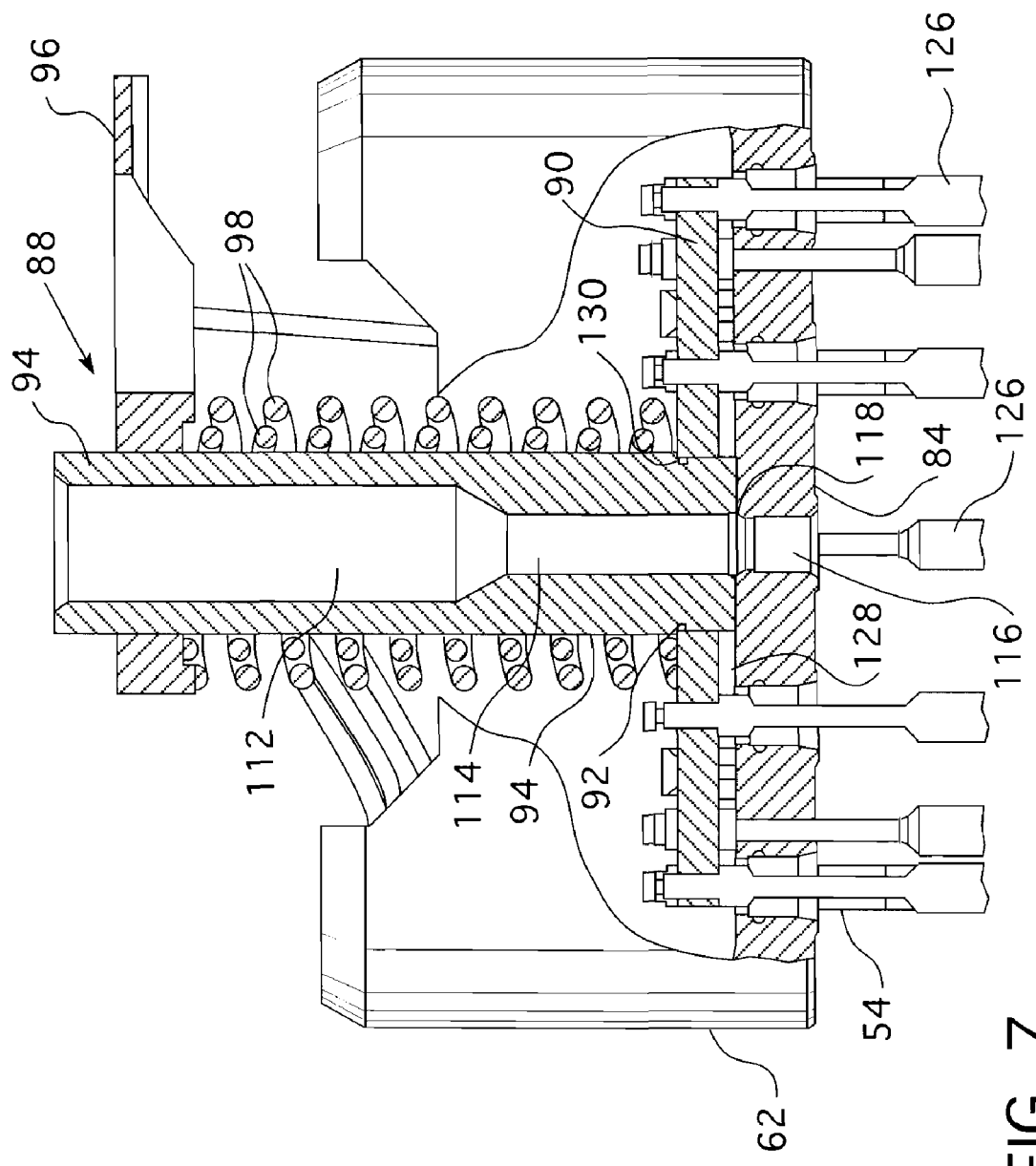
FIG. 7 is a cross-sectional view of a top nozzle of a fuel assembly with the hold-down device of this invention installed.

FIG. 7 shows a cross-sectional view of the upper section of the fuel assembly skeleton with the hold-down assembly 88 of this invention attached to the adapter plate 84 of the top nozzle 62. From this view it can be readily seen that the cylindrical spring guide 94 extends through and below a central opening 92 in the base plate 90 and rests upon the adapter plate 84 thus creating a space 128 between the adapter plate 84 and the base plate 90. The space 128 is provided so that the holddown force is carried by the spring guide 94 and not the base plate 90. The view of FIG. 7 clearly shows the enlarged diameter upper section 112 that narrows at approximately mid-height of the cylindrical spring guide 94, to the smaller diameter lower section 114. The lower section 114 of the spring guide 94 mates at 118 with the upper opening of the instrument tube 68 within the instrument tube counter bore 116. The arrangement shown in FIG. 7 is illustrated with the core component rodlet assemblies 126, such as a wet annular burnable absorber assembly, supported and extending axially down from the base plate 90. FIG. 7 shows that the spring guide 94 is attached to the base plate 90 by a welded or brazed joint. The hold-down assembly 88 is constructed from a material such as stainless steel or Inconel.

Thus, this invention provides a plate mounted core component hold-down assembly that is specifically designed to be compatible with a top mount instrumentation system and supplies a defined channel at a central location in the fuel assembly. The defined channel through the spring guide 94 is compatible with the insertion and removal of fixed in-core detector instrumentation to provide a guided path for the fixed in-core detector during insertion and to provide a shield against cross flow during reactor operation.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A nuclear core component hold-down assembly that accommodates top mounted instrumentation systems comprising:

a base plate sized to seat within a top nozzle of a nuclear reactor fuel assembly above and spaced from an adapter plate of the top nozzle, the base plate having a number of openings that align with an equal number of holes in the adapter plate through each of which a corresponding control rod guide thimble in the fuel assembly is accessed;

a vertical, hollow sleeve elongated along a dimension of elongation, having an axis along said dimension of elongation, the sleeve extending through and below a central opening in the base plate to mate with an upper opening in an instrument thimble in the fuel assembly, the sleeve extending vertically above the base plate and sized to extend through an upper core plate in the reactor when installed in a core of the reactor;

a hold-down bar slidably mounted on the sleeve and having an axial travel length that is restrained a given distance below the top of the sleeve so that the sleeve extends above the hold-down bar when the hold-down bar is fully extended in a direction away from the base plate; and a spring concentrically positioned around the sleeve and extending substantially between the hold-down bar and the base plate.

2. The hold-down assembly of claim 1 wherein the spring comprises two concentric springs.

3. The hold-down assembly of claim 1 wherein the vertical, hollow sleeve is sized to extend above the upper core plate in the reactor when installed in the core of the reactor.

4. The hold-down assembly of claim 1 wherein the sleeve has an axially extending slot that extends over the travel length of the hold-down bar and the hold-down bar has a radially, inwardly extending pin that respectively travels within the slot.

5. The hold-down assembly of claim 1 wherein an interior hollow cavity of the vertical sleeve has two different diameters along its axial length between the base plate and the hold-down bar.

6. The hold-down assembly of claim 5 wherein an upper section of the interior hollow cavity of the vertical sleeve has a larger inner diameter to receive an instrumentation shroud, than a lower portion of the interior hollow cavity of the vertical sleeve which guides a top mounted instrumentation through the top nozzle adapter plate into the instrumentation thimble in the fuel assembly.

7. The hold-down assembly of claim 6 wherein the upper section of the interior hollow cavity of the vertical sleeve has a sufficient cavity length to accommodate a differential thermal and irradiation growth between the fuel assembly and a reactor vessel in which the fuel assembly will be supported.

8. An elongated nuclear reactor fuel assembly having an axial dimension along its elongated length, the fuel assembly comprising:
   a top nozzle having an adapter plate;
   a plurality of control rod guide thimbles extending into corresponding openings in the adapter plate;
   an instrumentation thimble extending into a central opening in the adapter plate; and
   a hold-down assembly that accommodates top mounted instrumentation systems comprising;
      the elongated nuclear reactor fuel assembly above and spaced from the adapter plate of the top nozzle, the base plate having a number of openings that align with an equal number of holes in the adapter plate through each of which the corresponding control rod guide thimble in the fuel assembly is accessed;
      a vertical, hollow sleeve elongated along a dimension of elongation, having an axis along said dimension of elongation, the sleeve extending through and below a central opening in the base plate to mate with an upper opening in the instrumentation thimble in the fuel assembly, the sleeve extending vertically above the base plate and sized to extend through an upper core plate in a nuclear reactor when installed in a core of the reactor;
      a hold-down bar slidably mounted on the sleeve and having an axial travel length that is restrained a given distance below the top of the sleeve so that the sleeve extends above the hold-down bar when the hold-down bar is fully extended in a direction away from the base plate; and
      a spring concentrically positioned around the sleeve and extending substantially between the hold-down bar and the base plate.

9. The elongated nuclear reactor fuel assembly of claim 8 wherein the vertical, hollow sleeve is sized to extend above the upper core plate in the reactor when installed in the core of the reactor.

10. The elongated nuclear reactor fuel assembly of claim 8 wherein the sleeve has an axially extending slot that extends over the travel length of the hold-down bar and the hold-down bar has a radially, inwardly extending pin that respectively travels within the slot.

11. The elongated nuclear reactor fuel assembly of claim 8 wherein an interior hollow of the vertical sleeve has two different diameters along its axial length between the base plate and the hold-down bar.

12. The elongated nuclear reactor fuel assembly of claim 11 wherein an upper section of the interior hollow of the vertical sleeve has a larger inner diameter to receive an instrumentation shroud, than a lower portion of the interior hollow of the vertical sleeve which guides a top mounted instrumentation through the top nozzle adapter plate into the instrumentation thimble in the fuel assembly.

13. The elongated nuclear reactor fuel assembly of claim 12 wherein the upper section of the interior hollow cavity of the vertical sleeve has a sufficient cavity length to accommodate a differential thermal and irradiation growth between the fuel assembly and a reactor vessel in which the fuel assembly will be supported.

14. A nuclear reactor power generating system having a core comprising a number of fuel assemblies, at least some of the fuel assemblies comprising:
   a top nozzle having an adapter plate;
   a plurality of control rod guide thimbles extending into corresponding openings in the adapter plate;
   an instrumentation thimble extending into a central opening in the adapter plate; and
   a hold-down assembly that accommodates top mounted instrumentation systems comprising;
      a base plate sized to seat within the top nozzle of a nuclear reactor fuel assembly above and spaced from the adapter plate of the top nozzle, the base plate having a number of openings that align with an equal number of holes in the adapter plate through each of which the corresponding control rod guide thimble in the fuel assembly is accessed;
      a vertical, hollow sleeve elongated along a dimension of elongation, having an axis along said dimension of elongation, the sleeve extending through and below a central opening in the base plate to mate with an upper opening in the instrumentation thimble in the fuel assembly, the sleeve extending vertically above the base plate and sized to extend through an upper core plate in a nuclear reactor when installed in a core of the reactor;
      a hold-down bar slidably mounted on the sleeve and having an axial travel length that is restrained a given distance below the top of the sleeve so that the sleeve extends above the hold-down bar when the hold-down bar is fully extended in a direction away from the base plate; and
      a spring concentrically positioned around the sleeve and extending substantially between the hold-down bar and the base plate.

15. The nuclear reactor power generating system of claim 14 wherein the vertical, hollow sleeve is sized to extend above the upper core plate in the reactor when installed in the core of the reactor.

16. The nuclear reactor power generating system of claim 14 wherein the sleeve has an axially extending slot that extends over the travel length of the hold-down bar and the hold-down bar has a radially, inwardly extending pin that respectively travels within the slot.

17. The nuclear reactor power generating system of claim 14 wherein an interior hollow of the vertical sleeve has two different diameters along its axial length between the base plate and the hold-down bar.

18. The nuclear reactor power generating system of claim 17 wherein an upper section of the interior hollow of the vertical sleeve has a larger inner diameter to receive an instrumentation shroud, than a lower portion of the interior hollow of the vertical sleeve which guides a top mounted instrumentation through the top nozzle adapter plate into the instrumentation thimble in the fuel assembly.

19. The nuclear reactor power generating system of claim 18 wherein the upper section of the interior hollow cavity of the vertical sleeve has a sufficient cavity length to accommodate a differential thermal and irradiation growth between the fuel assembly and a reactor vessel in which the fuel assembly will be supported.

* * * * *